United States Patent [19]

Tepermeister et al.

[11] Patent Number: 4,974,628

[45] Date of Patent: Dec. 4, 1990

[54] CHECK VALVE CARTRIDGES WITH CONTROLLED PRESSURE SEALING

[75] Inventors: Gary Tepermeister, Pleasant Hill; Alan Carter, Fremont, both of Calif.

[73] Assignee: Beckman Instruments, Inc., Fullerton, Calif.

[21] Appl. No.: 363,217

[22] Filed: Jun. 8, 1989

[51] Int. Cl.5 .............................................. F16K 15/04
[52] U.S. Cl. ............................. 137/454.4; 137/533.15
[58] Field of Search ............... 137/454.4, 454.5, 454.6, 137/533.15; 251/361, 363, 362

[56] References Cited

U.S. PATENT DOCUMENTS

| Re. 31,608 | 6/1984 | Magnussen, Jr. ..................... 417/22 |
| 1,374,621 | 4/1921 | Wicker ............................. 251/363 X |
| 1,679,283 | 7/1928 | Wells et al. ...................... 251/362 X |
| 2,934,314 | 4/1960 | Kenann ............................. 251/363 X |
| 3,536,092 | 10/1970 | Klasson ........................... 251/362 X |
| 3,661,167 | 5/1972 | Hussey ......................... 137/533.15 X |
| 4,040,442 | 8/1977 | Alexandre ....................... 251/363 X |
| 4,139,469 | 2/1979 | Rainin et al. ....................... 210/136 |
| 4,222,412 | 9/1980 | Carle ............................... 137/625.47 |
| 4,378,028 | 5/1983 | Weber et al. ..................... 251/361 X |
| 4,387,736 | 6/1983 | Major ................................... 137/550 |
| 4,566,486 | 1/1986 | Taylor et al. ..................... 251/362 X |
| 4,622,990 | 11/1986 | Norman ............................... 137/315 |

FOREIGN PATENT DOCUMENTS 2534316 2/1976 Fed. Rep. of Germany ...... 251/362

Primary Examiner—Stephen M. Hepperle
Attorney, Agent, or Firm—William H. May; Paul R. Harder; Wen Liu

[57] ABSTRACT

A check valve cartridge insertable into a valve housing which is adapted to couple to a pump fluid head. The check valve cartridge has a fluid pathway therethrough with a desired direction for fluid flow. The cartridge utilizes a ball-seat assembly to control the direction of fluid flowing through the cartridge to the desired direction. The ball-seat assembly includes a rigid seat which is compliantly supported within the cartridge by thin compliant spacers. The check valve cartridge further has deformable seals which partially fit within the opposed ends of a cartridge body and are adapted to cold flow and seal to a surface when subjected to a force. One of the deformable seals is adapted to seal against a surface of the pump fluid head and has slidably mounted over its end a rigid ring which constrains the cold flow of the end of the seal that seals to the pump fluid head. The check valve cartridge may be designed to be used for inlet and outlet check valves.

23 Claims, 2 Drawing Sheets

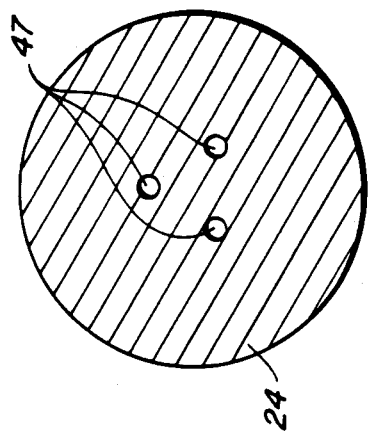
FIG._5.
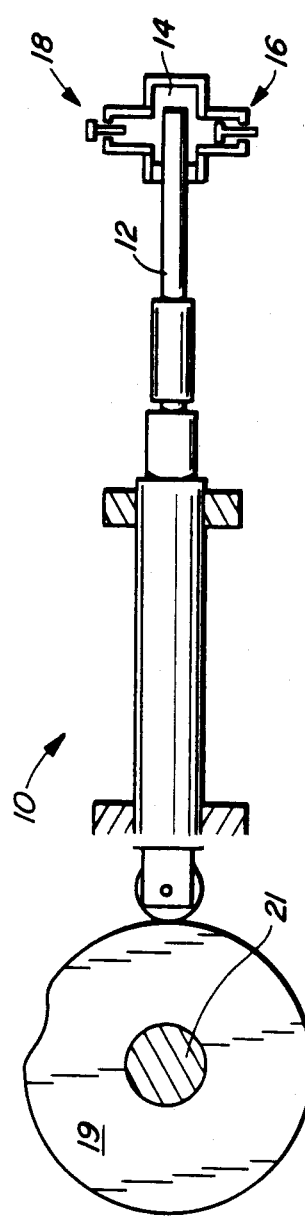
FIG._1.
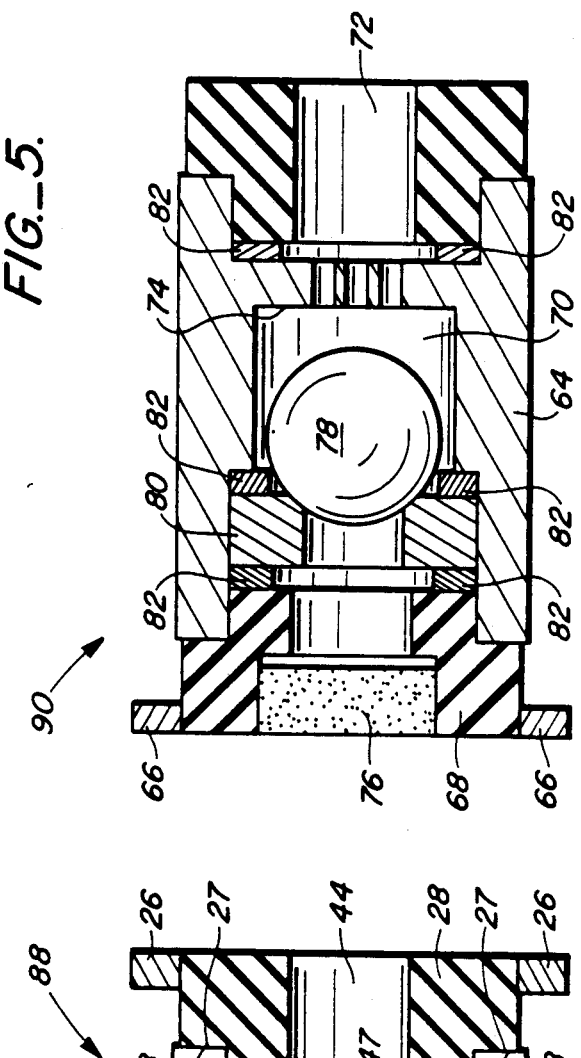
FIG._4.
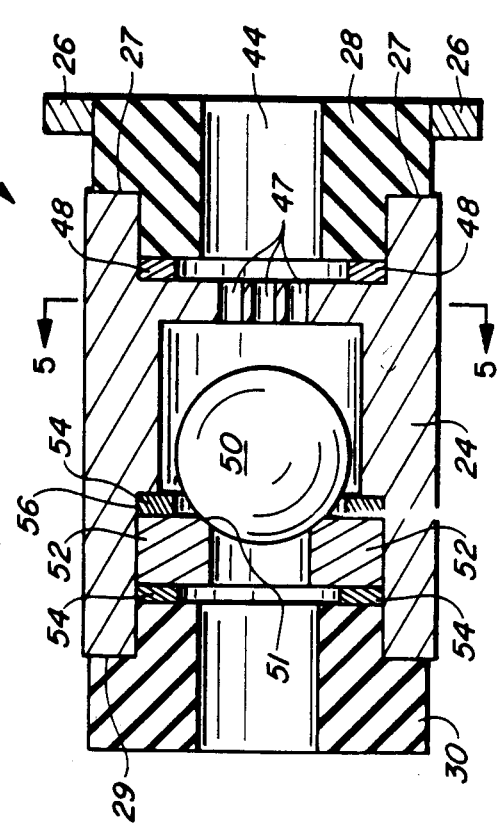
FIG._3.

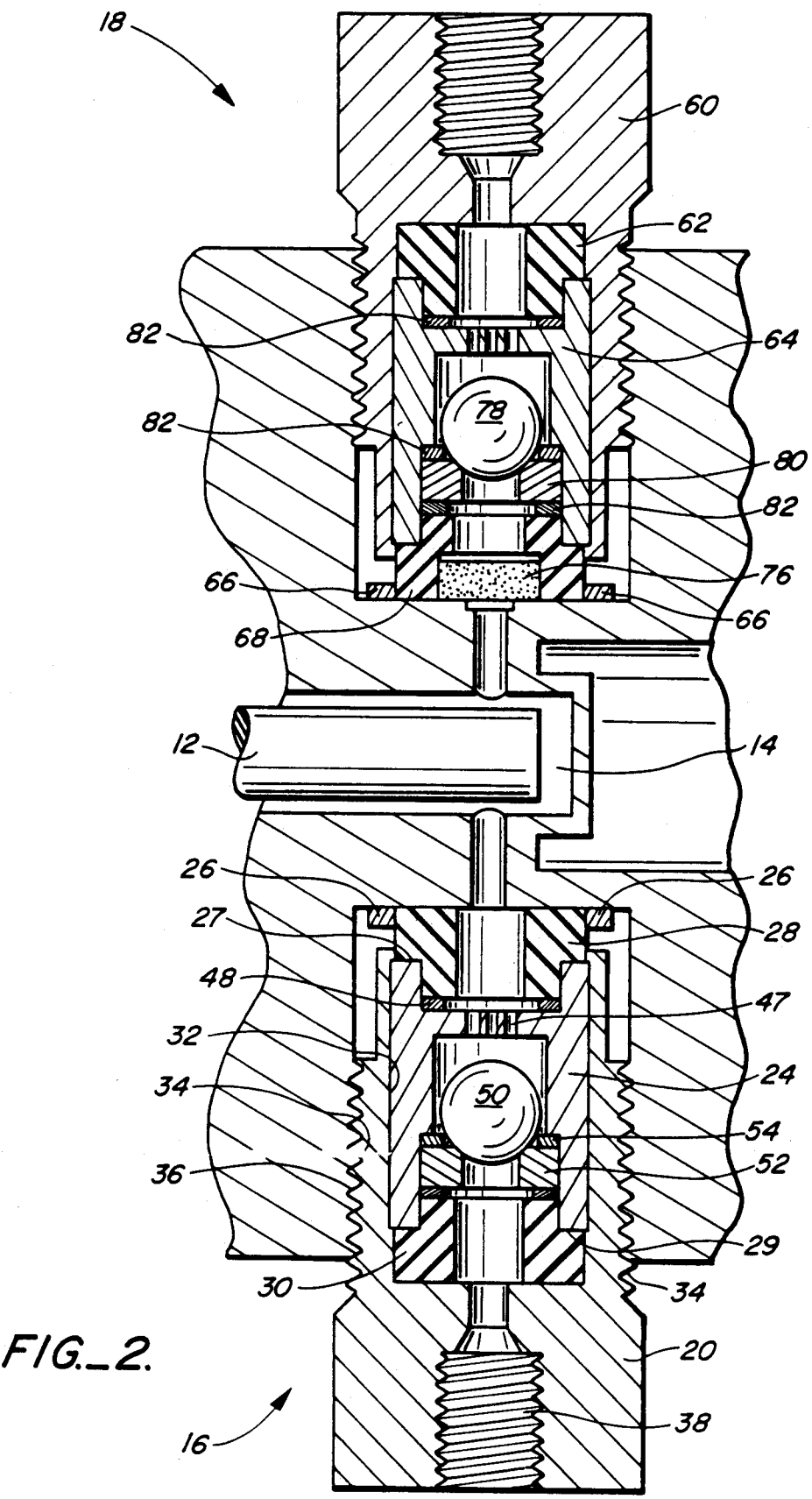
FIG._2.

CHECK VALVE CARTRIDGES WITH CONTROLLED PRESSURE SEALING

TECHNICAL FIELD

The present invention relates to check valves and more particularly to ball-seat check valves.

BACKGROUND OF THE INVENTION

Liquid chromatography instruments often employ high performance and high pressure reciprocating pumps which use automatically operated check valves to control the liquid flow through the systems. Ball-seat check valves are often used for this purpose.

A concern associated with the use of ball-seat check valves is leakage. It has been discovered that contaminant particles in the liquid are one cause of the leakage. A partial solution to both of these problems was found in providing filters within the check valves which decrease the amount of contaminant particles in the liquid, which in turn lessens the number of contaminant particles that interferes with the ball-seat closure. Examples of ball-seat check valves of this type are found in U.S. Pat. Nos. 4,139,469 to Rainin et al. assigned to the assignee of the present invention, and 4,387,736 to Major. With particular reference to the Rainin et al. patent, the check valve described therein includes deformable washers, which cold flow to mating surfaces when subjected to a force and also serve as a filter holder. The check valve of Rainin et al. further includes a threaded housing which is engageable with a pump housing. When the housings are threaded together a compression force is generated which causes the washers and the filter holder to cold flow and seal the check valve to the pump housing. While the above-identified check valves reduce the risk of leakage between the ball and seat, leakage is still a problem. Moreover, the filters of such valves become clogged with time and must then be replaced or serviced.

From tests conducted by the assignee of the present invention, it was found in prior art valves that under high pressures certain areas of the valves often developed leaks. Three primary areas of leakage were discovered. The first area of leakage was found to occur at the ball-seat interface. It was observed that high pressures on a rigidly supported seat can cause distortions of the seat which cause leakage and even breakage of the seat. The second area of leakage was found around the ball-seat assembly, rather than through it. The joinder or abutting surfaces of the seat and the rigid support surfaces provides an alternative pathway for the fluid. The third area of leakage was found at the seals formed by the deformable washers and filter holder. The high pump pressures caused the deformable washers and filter section, of prior art check valves to cold flow radially outward over a period of time, thereby compromising the seal that was previously formed. To stop any leakage at the seals, the valve body must be tightened with a greater torque. This means that an operator has to periodically retighten the valve coupling. After several retightenings, substantial cold flow occurs in the deformable washer and a good seal is usually obtained.

It is therefore an object of the present invention to provide a check valve for use in a high performance and high pressure fluid system that is easy to assemble, convenient to install and maintain, and that has excellent sealing characteristics with little or no leakage.

SUMMARY OF THE INVENTION

The above object has been met by a removable check valve cartridge which compliantly supports a valve seat therein, and which has deformable seals with a controlled plastic deformation. The check valve cartridge is designed to be removably received within the hollow of a valve housing, which couples with a pumping assembly, typically using threaded parts.

The check valve cartridge includes a cylindrical cartridge body that has annular seals extending from the ends of the cartridge body. When the cartridge is inserted into a valve housing and coupled to the pumping assembly, one of the seals fits against a surface within the valve housing, while the other seal extends out of the hollow and fits against a mounting surface of the pumping assembly. The seals are deformable, so that under a pressure created by coupling the valve to the pumping assembly, the seals cold flow to their respective surfaces. A rigid ring is slidably mounted to the end of the seal which extends out of the hollow of the valve housing. This ring constrains the cold flow of the end of the seal, so that there is little radial cold flow near the mounting surface of the pumping assembly. The outside diameter of the ring is larger than the inside diameter of the hollow, thus ensuring that the correct end of the valve cartridge will be inserted into the valve housing and eliminating the need for flow direction markings on the cartridge.

The interior of the cartridge body is divided into two chambers by an internal wall. Restricted passages in the internal wall fluidly connect the two chambers. One of the chambers contains and supports a ball-seat assembly that comprises a rigid spherical plug or ball and a rigid annular seat. The annular seat has a conduit through its center and a seat surface that dimensionally corresponds with the spherical plug to seal the conduit when the plug and seat surface fit together. The spherical plug moves freely between the seat surface and the internal wall under the influence of fluid flow through the valve cartridge. Fluid flow in one direction causes the spherical plug to move away from the seat surface allowing continued fluid flow. The motion of the ball in the fluid stream is restrained by the separating wall, which has three holes at the corners of an equilateral triangle that serve to prevent the ball from sealing the passage at that wall. These holes serve as fluid passages through the wall, which cannot be blocked by the ball. Fluid flow in the opposite direction causes the spherical plug to move towards and to fit tightly against the seat surface to block continued fluid flow. Thus, the fluid flow through the valve cartridge is substantially restricted to one direction.

Improved internal sealing through and around the ball-seat assembly is provided by compliantly supporting the rigid annular seat between a pair of thin compliant spacers, which are deformed to take up irregularities upon tightening the cartridge holder into its receptive housing. As noted previously, high pressures tend to distort the rigid annular seat when rigidly supported, causing poor sealing between the ball and seat surface. The pair of compliant spacers gives the rigid annular seat a small degree of compliance which reduces the amount of distortion in the rigid seat under high pressure, thereby providing a continued good seal between the ball and seat surface. One of the spacers is located between the joinder of a lip within the interior of the cartridge body and the annular seat. The other spacer is located between the joinder of the annular seat and one of the deformable seals. These compliant spacers also act to seal the two joinder areas against fluid flowing around the annular seat. Another spacer located between the deformable seal at the other end of the cartridge and the corresponding side of the separating wall serves to better seal that deformable seal to the separating wall.

An advantage of the present invention is that because the rigid ring is mounted to the deformable seal that fits against the mounting surface of the pumping assembly, periodic retightenings of the valve housing are not needed to restore a good seal between the seal and the mounting surface. Also, since the metal ring limits the radial flow of the deformable seal, the torque used to provide the seal need not be as tightly controlled. Reasonable overtorquing will not cause severe distortion and possible failure of the seal. In the outlet check valve, severe distortion could result in a loss of the ability of the seal to securely hold the filter and in some instances damage to the filter. Further, inserting the incorrect end of the valve cartridge into the valve housing is eliminated by inclusion of the ring. The ring also provides a finger hold for removing the valve cartridge from the valve housing.

BRIEF DESCRIPTION OF THE DRAWINGS

FIG. 1 is a plan view of a reciprocating pump with an inlet and an outlet check valve.

FIG. 2 is an enlarged cross sectional view of an inlet and an outlet check valve coupled to a reciprocating pump of the type shown in FIG. 1, in accord with the present invention.

FIG. 3 is an enlarged view of the inlet cartridge of FIG. 2.

FIG. 4 is an enlarged view of the outlet cartridge of FIG. 2.

FIG. 5 is cross sectional view taken along lines 5—5 in FIG. 3.

BEST MODE FOR CARRYING OUT THE INVENTION

Referring to FIG. 1, a reciprocating metering pump 10 of the type used in liquid chromatography is shown, in which a pump piston 12 is driven within a fluid pumping chamber 14. Pressures of 6000 psi or more may be generated by pumps of this type. An inlet check valve 16 and an outlet check valve 18 are used to control fluid flow into and out of the fluid pumping chamber 14. A cam 19 rotatably mounted on shaft 21, causes the reciprocating motion of the pump piston 12.

Referring now to FIGS. 2–4, a more detailed view is shown of the fluid connections between the pumping chamber 14 and the inlet check valve 16 and the outlet check valve 18. Beginning with the inlet check valve 16, a valve housing 20 has an internal valve cartridge receiving hollow 32 and an external threaded portion 34 for threaded engagement with a pump housing seating 36 which is internally threaded. The valve housing 20 further has an internally threaded portion 38 which accepts the threaded fitting of a fluid supply line, not shown. The valve housing 20 has a rigid construction and may be made from such materials as stainless steel, ceramics and plastics.

A removable inlet check valve cartridge 88, shown separately in FIG. 3, is inserted into the receiving hollow 32 of the valve housing 20. The inlet check valve cartridge 88 includes a cartridge body 24 that has opposed ends 27 and 29 in which deformable seals 28 and 30 respectively fit. The deformable seals 28 and 30 cold flow when subjected to a force, such as that resulting from the force exerted on the seals when the inlet check valve 16 is threaded to the pump housing 22. The deformable seals 28 and 30 are preferably made from Teflon, Kel-F, and other like plastics. Teflon is a trademark owned by E.I. DuPont De Nemours and Company for synthetic resin polymers and their products.

When assembling the inlet check valve 16, the cartridge end having the deformable seal 30 is inserted into the receiving hollow 32 of the valve housing 20. The cartridge end having the deformable seal 28 extends a distance out of the valve housing 20. Slidably, yet snugly, mounted to the end of the deformable seal 28 is a rigid ring 26. Stainless steel is a preferred material for the rigid ring 26, but other rigid materials may also be used. The rigid ring 26 keeps the end of the deformable seal 28 from cold flowing in a radial direction. Thus, the high fluid pressures or torquing cause little radial cold flow at the end of the seal 28. Because the rigid ring 26 has an outside diameter greater than the inside diameter of the cartridge receiving hollow 32, only the cartridge end that has the deformable seal 30 can fit into the hollow 32.

The cartridge body 24 has an internal wall 42 that defines two separate internal chambers 44 and 46, which are in fluid communication with each other through passages 47 in the internal wall 42. The passages 47 are holes at corners of an equilateral triangle, as seen in FIG. 5. Spacing of the holes in this manner prevents the ball from sealing the passage at that wall. The internal chamber 44 which is nearest the pumping chamber 14 is partially occupied by a section of the deformable seal 28. A very thin compliant spacer 48 having an annular shape is located between the deformable seal 28 and the internal wall 42. The internal chamber 46 contains a ball 50 and an annular seat member 52 with a centrally located conduit therethrough. The ball 50 is adapted to freely move within the internal chamber 46 to either an open condition or a closed condition. The closed condition occurs when the ball 50 fits against a corresponding seat surface 51 of the seat member 52, thereby blocking fluid flow through the conduit. The seat surface 51 is highly polished and dimensionally corresponds to a portion of the ball 50. Movement of the ball 50 is influenced by the fluid flow through the internal chamber 46. The ball 50 and the seat member 52 are typically made of rigid materials such as sapphire or ruby. The seat member 52 is firmly yet compliantly supported within the internal chamber 46. A pair of annular compliant spacers 54 are positioned between a lip 56 in the cartridge body and the seat member 52 and the deformable seal 30 and the seat member 52. The pair of annular compliant spacers 54 are similar to the spacer 48. The spacers may be made of Teflon, a trademark for polytetrafluoroethylene, and have a preferred thickness of 0.005 inch.

Returning to FIG. 2, the outlet check valve 18 includes a valve housing 60, like the valve housing 20 in the inlet check valve 16, and includes an outlet check valve cartridge 90. Turning to FIG. 4, the outlet check valve cartridge 90 is removably insertable within the valve housing 60 and like the inlet check valve cartridge 88, includes a cartridge body 64 identical to the cartridge body 24. The cartridge body 64 has an insert end with a deformable seal 62 and a pump coupling end with a deformable seal 68. Slidably mounted to the outside of the deformable seal 68 is a rigid ring 66, like the rigid ring 26. Tightly mounted in an opening to the deformable seal 68 is a filter 76, made of frit material, which traps contaminant particles. A clogged filter 76 may be replaced by replacing the entire outlet cartridge or by replacing the sub-assembly consisting of rigid ring 66, deformable seal 68 and filter 76. A filter in the inlet check valve is generally not used because the pressure drops across the filter at high flow rates would adversely affect the flow into the piston chamber. The cartridge body further defines two internal chambers 70 and 72 separated by an internal wall 74. Contained within the internal chamber 70, nearest the pumping chamber 14, is a ball 78 and a seat member 80, like the ball 50 and the seat member 52 in the inlet check valve cartridge 88. Thin compliant spacers 82 are also provided in the outlet check valve cartridge 90 like the thin compliant spacers 48 and 54 in the inlet check valve cartridge 88.

The thin compliant spacers used in both the inlet and outlet check valve cartridges have a preferred thickness of 0.005 inch, and act as a cushion and a tolerance irregularities absorbing member. These characteristics of the thin compliant spacers are especially important in the area where the seat member and the cartridge body join.

In operation, the pump piston 12 has a defined delivery stroke and refill stroke. During the delivery stroke, the ball 50 is caused to fit tightly against the ball seat surface of the seat member 52, thus closing the inlet check valve 16. At the same time, ball 78 moves away from the seat member 80, thus opening the outlet check valve 18. As pump piston 12 advances, the fluid is forced out of the pumping chamber 14 and through the outlet check valve 18. During the refill stroke the opposite occurs. The outlet check valve 18 is closed and the inlet check valve 16 is open. As the pump piston retreats, fluid is drawn into the pumping chamber 14 through the inlet check valve 16. The rigid rings 26 and 66, mounted to the deformable seals 28 and 68 respectively, keep their respective seals from cold flowing radially during operation of the pump 10 or torquing of the valve assemblies 16 and 18. This results in providing good seals between the check valves 16 and 18 and the pump housing 22, which seals require no, or at most one or two retightenings to maintain. Moreover, the operational life of the check valves is increased and leakage is reduced, especially in high pressure conditions.

What is claimed is:

1. A check valve cartridge to stand against a rigid mounting surface, the cartridge comprising:
    a hollow cartridge body defining an internal elongated axial passageway and having an inlet port for admitting fluid into the passageway and an outlet port for conducting the admitted fluid out of the passageway;
    a valve seat member disposed within the passageway between said inlet and outlet ports, the valve seat member having a seat surface defining a portion of said passageway therethrough;
    a plug disposed within the passageway between the outlet port and the seat surface of said valve seat member, the plug being freely movable under the influence of the fluid flow through said passageway, said plug having a first extreme position in fluid seal relation with said seat surface and having a second extreme position in spaced relation to said seat surface;
    a first deformable seal having a first section sized to fit tightly within said cartridge body and having a second section protruding from said cartridge body, the first deformable seal defining part of the passageway and being made of a material having characteristics to allow cold flow of the first seal to a rigid surface upon the application of a force to the first deformable seal; and
    means for constraining the radial extent of the cold flow of an end portion of said second section of said first deformable seal which comes into contact with an adjacent mounting surface, the means for constraining surrounding said end portion of said second section of said first deformable seal.

2. The check valve cartridge of claim 1 wherein said means for constraining comprises a rigid ring slidably mounted over the end of said second section of said first deformable seal.

3. The check valve cartridge of claim 1 wherein said first section of said first deformable seal fits within said outlet port.

4. The check valve cartridge of claim 3 further comprising a second deformable seal having a first section sized to fit tightly within said inlet port and having a second section protruding from said inlet port to the exterior of the cartridge body, the second deformable seal defining a portion of the passageway therethrough.

5. The check valve cartridge of claim 1 wherein said first section of said first deformable seal fits within said inlet port.

6. The check valve cartridge of claim 5 further comprising a second deformable seal having a first section sized to fit tightly within said outlet port and having a second section protruding from said outlet port to the exterior of the cartridge body, the second deformable seal defining a portion of the passageway therethrough.

7. The check valve cartridge of claim 1 wherein said plug is spherical.

8. The check valve cartridge of claim 1 wherein said cartridge body includes an interior wall separating said hollow of the cartridge body into a first chamber and a second chamber, the internal wall defining a portion of said passageway therethrough.

9. The check valve cartridge of claim 1 further comprising a tubular support means coaxially disposed in said passageway between said inlet and outlet ports for compliantly cushioning said valve seat member when it is subject to high pressure so as to reduce the amount of distortion of the valve seat.

10. The check valve cartridge of claim 9 wherein said support means comprises a compliant spacer securely supported within said cartridge body, the compliant spacer contacting an opposed end of said seat member.

11. The check valve cartridge of claim 9 wherein the means for constraining comprises a rigid ring slidably mounted over the end of said second section of said first deformable seal.

12. The check valve cartridge of claim 9 wherein said first section of said first deformable seal fits within said outlet port.

13. The check valve cartridge of claim 12 further comprising a second deformable seal having a first section sized to fit tightly within said inlet port and having a second section protruding from said inlet port to the exterior of the cartridge body, the second deformable seal defining a portion of the passageway therethrough.

14. The check valve cartridge of claim 9 wherein said first section of said first deformable seal fits within said inlet port.

15. The check valve cartridge of claim 14 further comprising a second deformable seal having a first section sized to fit tightly within said outlet port and having a second section protruding from said outlet port to the exterior of the cartridge body, the second deformable seal defining a portion of the passageway therethrough.

16. The check valve cartridge of claim 9 wherein said plug is spherical.

17. The check valve cartridge of claim 9 wherein said cartridge body includes an interior wall separating said hollow of the cartridge body into a first chamber and a second chamber, the internal wall defining a portion of said passageway therethrough.

18. A check valve to stand against a rigid mounting surface, the check valve comprising:
   a hollow body defining an internal elongated axial passageway and having an inlet port for admitting fluid into the passageway and an outlet port for conducing the admitted fluid out of the passageway;
   a valve seat member disposed within the passageway between said inlet and outlet ports, the valve seat member having a seat surface defining a portion of said passageway therethrough;
   a plug disposed within the passageway between the outlet port and the seat surface of said valve seat member, the plug being freely movable under the influence of the fluid flow through said passageway, said plug having a first extreme position in fluid seal relation with said seat surface and having a second extreme position in spaced relation to said seat surface;
   a first deformable seal having a first section sized to fit tightly within said cartridge body and having a second section protruding from said cartridge body, the first deformable seal defining part of the passageway and being made of a material having characteristics to allow cold flow of the first seal to a rigid surface upon the application of a force to the first deformable seal; and
   means for constraining the redial extent of the cold flow of an end portion of said second section of said first deformable seal which it comes into contact with an adjacent mounting surface, the means for constraining surrounding said end portion of said second section of said first deformable seal.

19. The check valve of claim 18 further comprising a support means for compliantly cushioning the valve seat member when it is subject to high pressure so as to reduce the amount of distortion of the valve seat.

20. The check valve of claim 19 wherein the means for constraining comprises:
   a rigid ring slidably mounted over the end of said second section of said first deformable seal.

21. The check valve of claim 20 wherein the valve seat member, plug, support means, first deformable seal and ring are part of a replaceable cartridge housed in the check valve.

22. The check valve of claim 18 wherein the valve seat member, plug, first deformable seal and constraining means are part of a replaceable cartridge housed in the check valve.

23. The check valve of claim 19 wherein the valve seat member, plug and support means are part of a replaceable cartridge housed in the check valve.

* * * * *